Aug. 20, 1929.  A. A. HEINZELMAN  1,725,001
VARIABLE SPEED TRANSMISSION
Filed Sept. 14, 1928    4 Sheets-Sheet 1

INVENTOR
Alphonse A. Heinzelman
BY
ATTORNEY

Aug. 20, 1929.     A. A. HEINZELMAN     1,725,001
VARIABLE SPEED TRANSMISSION
Filed Sept. 14, 1928     4 Sheets-Sheet 3

INVENTOR
Alphonse A. Heinzelman
BY
his ATTORNEY

Patented Aug. 20, 1929.

1,725,001

UNITED STATES PATENT OFFICE.

ALPHONSE A. HEINZELMAN, OF NEW YORK, N. Y., ASSIGNOR, BY DIRECT AND MESNE ASSIGNMENTS, TO BLUDALK, INC., OF NEW YORK, N. Y., A CORPORATION OF NEW YORK.

VARIABLE-SPEED TRANSMISSION.

Application filed September 14, 1928. Serial No. 306,010.

My invention relates to transmissions and refers particularly to variable speed transmissions.

One of the objects of my invention is a device in which the rotatable speed of a driven member may be governed and controlled by the rotatable speed of the driving member without the interposition or necessity of change-speed or gear-shift mechanism.

The many disadvantages of gear-shift transmissions are generally recognized and while numerous attempts have been made to devise transmissions eliminating the use of gear-shifts, none of them has been sufficiently efficient to meet with general practical adoption.

While transmissions are employed in many machines for the transmission of variable speeds, their principal application is found in automobiles, in which the constant changing of power requirements makes them a most important element of automobile machine construction.

Although the present employed automobile transmissions involving gear-shifts have considerable value for the transmission of variable power, they possess many disadvantages, particularly because their application is generally controlled by those unfamiliar with their operation, consequently, frequently resulting in serious injury to the mechanism; and a special disadvantage of such gear-shift transmissions is that a measurable period of time is required in order to shift from one gear to another, during which period the desired change of speed of the automobile is not accomplished; and as a rapid change of speed is frequently imperative in automobiles, such gear-shift transmissions are dangerous to safety.

It is evident, therefore, that a transmission, free from gear-shifts and having a constantly changing speed of the driven member dependent only upon the speed of the engine, would have high efficient and safety values over the gear-shift type of mechanism.

The device of my invention overcomes the above-mentioned and many other objectionable features of the gear-shift transmissions and presents a transmission in which the speed of the driven member is controlled entirely by the speed of the driving member.

The transmission of my invention comprises a device in which the revolution of the driving member produces a centrifugal force upon the driven member causing the latter to revolve and in which the centrifugal force increases with the increased speed of revolution of the driving member.

Further, it will be evident upon a consideration of my device, that as the increasing speed of the driving member increases the centrifugal force, the power of the driven member will increase.

I thus present a transmission, free from gear-shifts, and in which the power and speed of the driven member are controlled by the speed of the driving member, thus overcoming the dangers and difficulties incident to transmissions involving the use of gear-shifts.

In the particular form of the device of my invention disclosed in the accompanying drawings, similar parts are designated by similar numerals.

Figure 1:
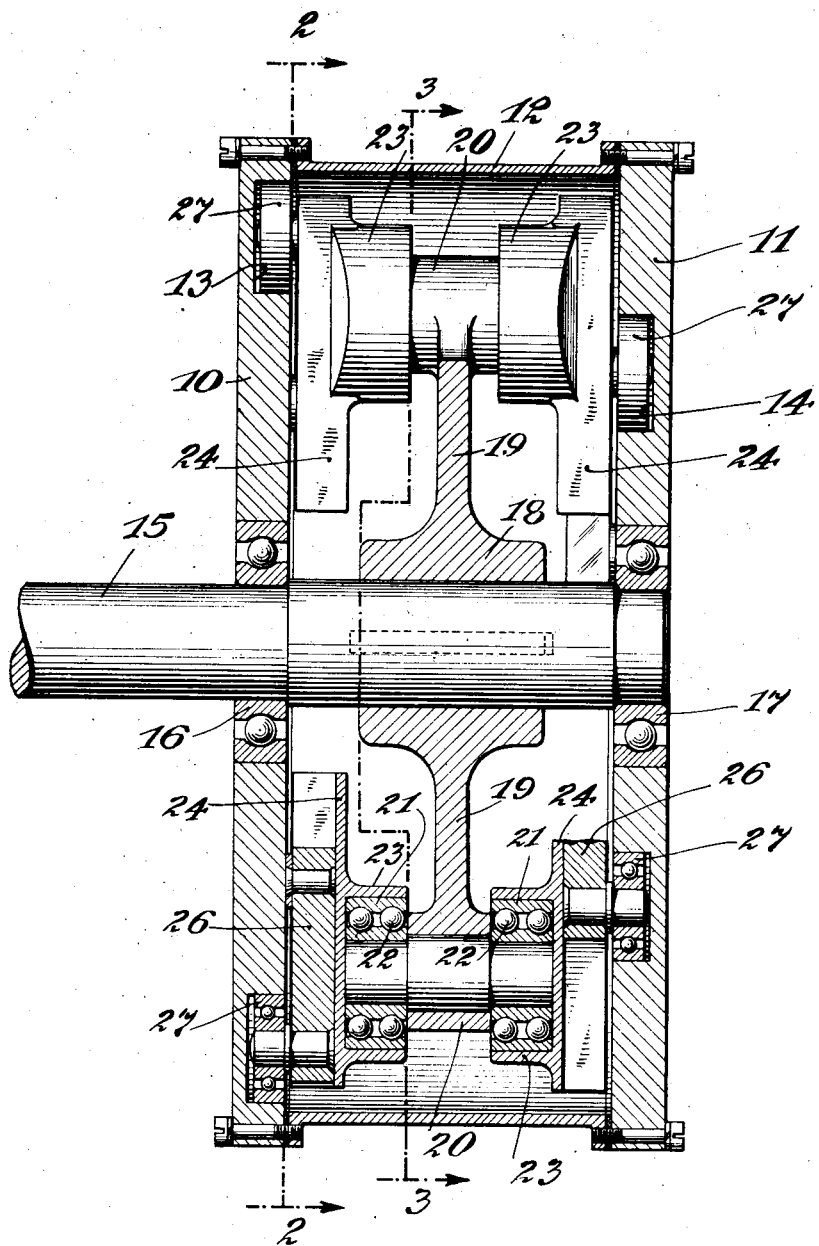
Figure 1 is a section through the line 1—1 of Figure 2 and the line 1—1 of Figure 3.

The particular form of the device of my invention illustrated in the accompanying drawings comprises a cylindrical revoluble casing, or driven member, having the end members 10 and 11 and the annular side member 12, the end member and the side member being fixedly attached to each other.

Within the inner face of the end member 10 is a cam runway 13 and within the inner face of the end member 11 is a cam runway 14, these two cam runways being of similar configuration, their longitudinal diameters being positioned at right angles to each other.

A revoluble drive shaft 15 passes through centrally positioned opposed openings within the end members 10 and 11, being supported therein by the roller-bearings 16 and 17.

The drive shaft 15 carries the fixedly attached spider 18 having a plurality of extended legs 19, 19, which are shown as seven in number, each leg 19 carrying a fixed extended arm 20. The extremity of each extended arm 20 carries a revoluble annular supporting member 21, revoluble upon a ball-bearing member 22.

Fixedly attached to each revoluble supporting member 21 is a centrifugal-member carrier consisting of the annular element 23 fitting over a supporting member 21 and attached thereto and a centrifugal-member guide runway 24.

Each centrifugal-member carrier carries a centrifugal-member which comprises a triangular-shaped base 25 having an extended boss, or flange, 26 upon one face thereof, said flange 26 being slidable within a centrifugal-member guide runway 24, the other face of the base 25 carrying two revoluble roller-bearing rollers 27 and 28, the leading roller 27 being positioned in the longer axis of the base 25 and the follower roller 28 being offset therefrom and in a shorter axis of the base 25.

The series of rollers 27 and 28 carried by the respective ends of the arms 20, are positioned within the respective cam runways 13 and 14 and are movable therein, and as each centrifugal-member carrier is so positioned that the axis of its centrifugal-member guide is in the direction of the movement of the wheels 27 and 28 around the cam runways 13 and 14, the roller 27 will always be in advance of the roller 28.

Figure 2:
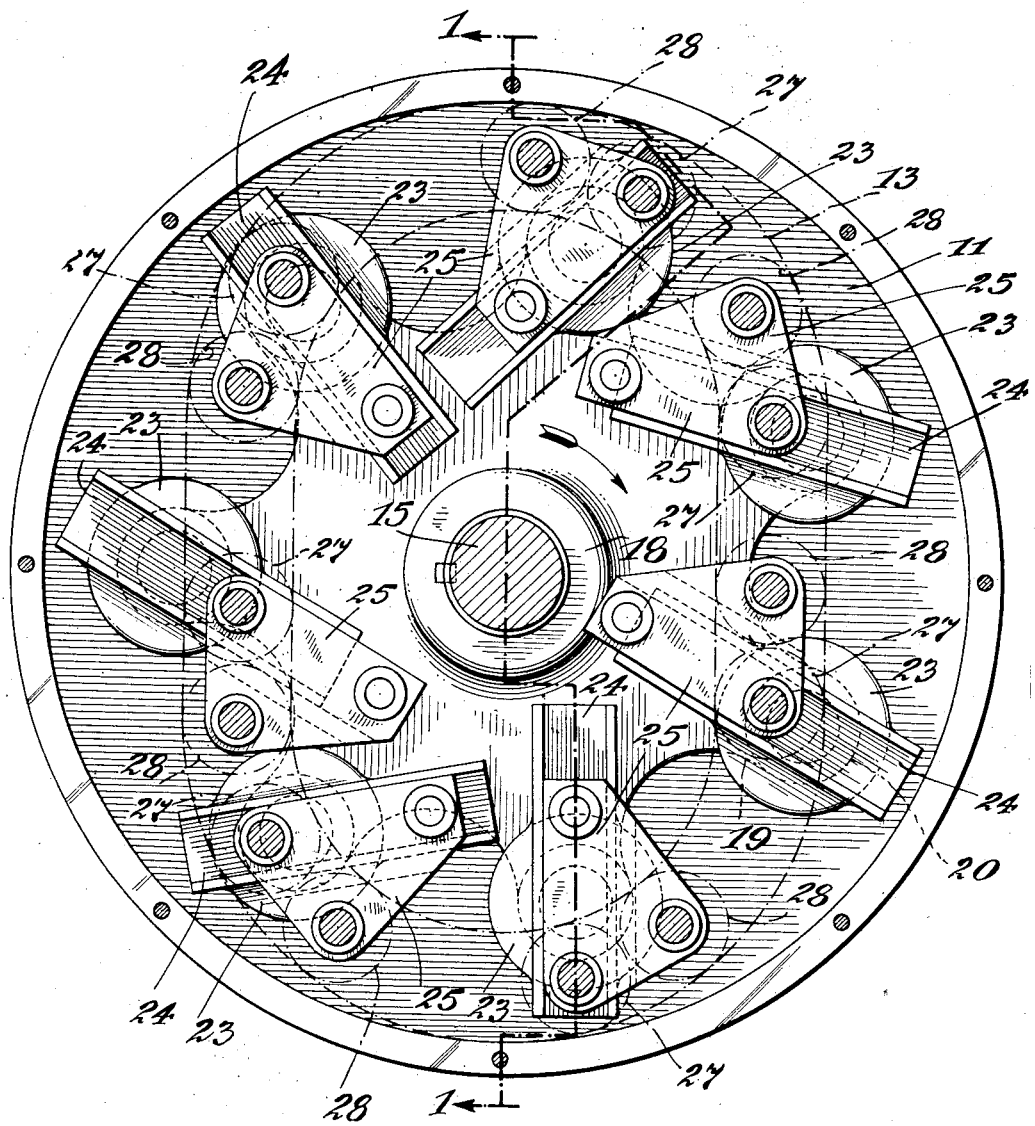
Figure 2 is a section through the line 2—2 of Figure 1.
Figure 3:
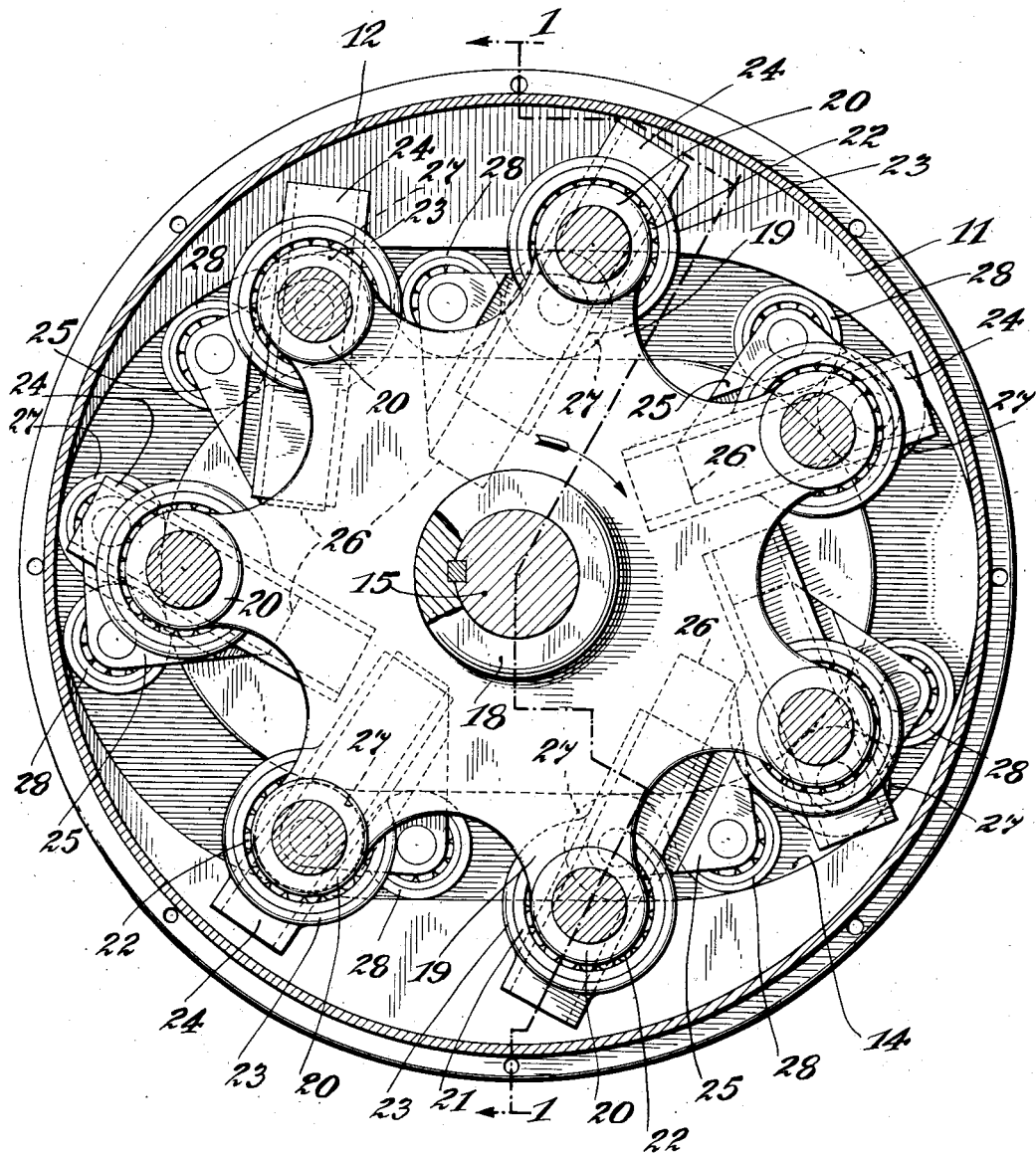
Figure 3 is a section through the line 3—3 of Figure 1.
Figure 5:
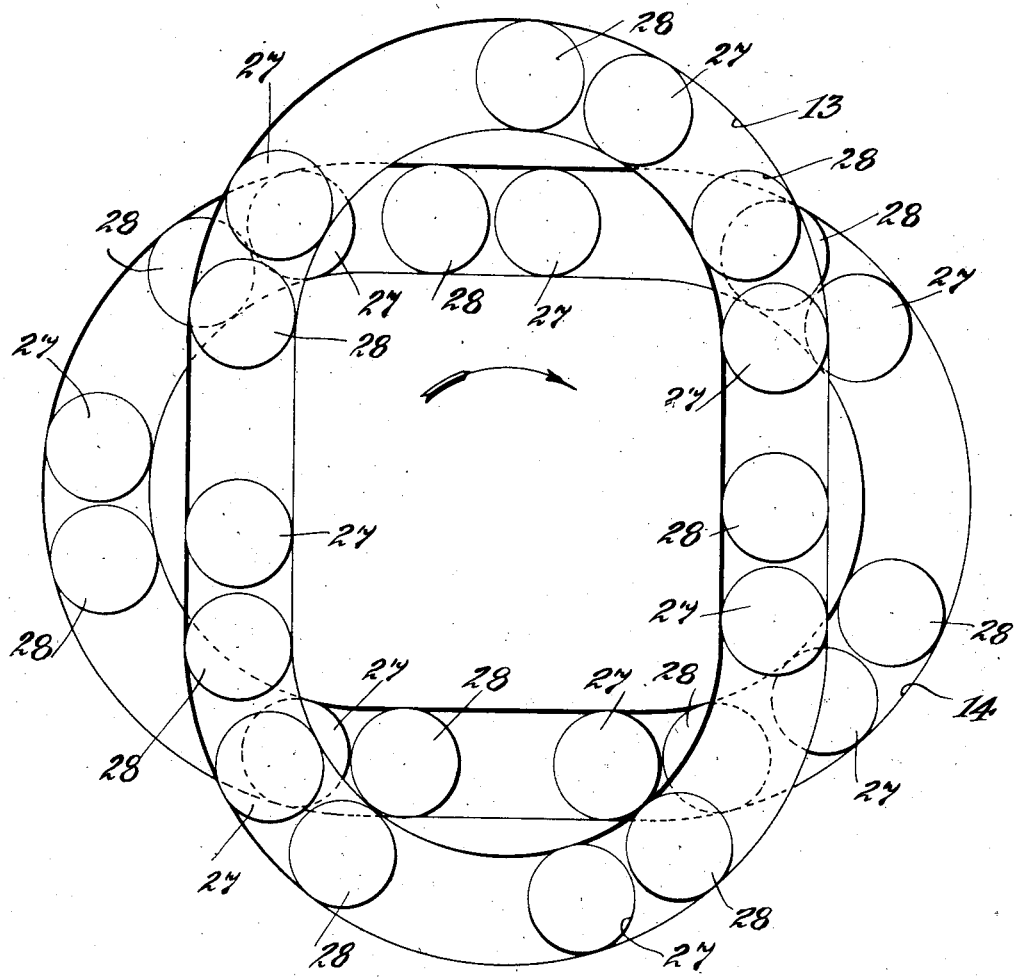
Figure 5 is a graphic view of the two cam runways of my illustrated device indicating the positions of the impact rollers in a particular position of the drive shaft.
Figure 4:
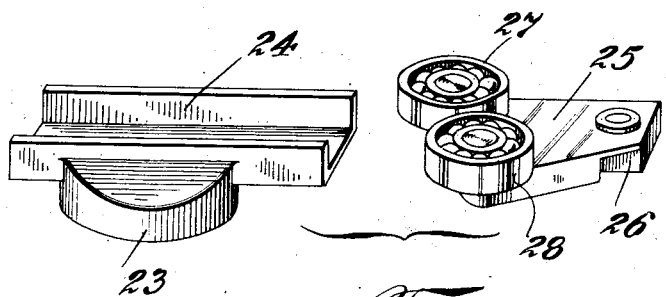
Figure 4 is a perspective view of a centrifugal member and its member.

It is evident, therefore, that as the cam runways are not circular, the centrifugal-member carriers will rotate pivotally upon the ends of the arms 20 and that the angle of the axis of the centrifugal-carrier guides 24, 24 with respect to the axis of its cam runway will vary during the revolution of the drive shaft 15, as shown particularly in Figures 2 and 3.

It is further evident that as the axis of the cam runways 13 and 14 are at right angles to each other, the axis of the two centrifugal-member guides 24, 24 upon opposite ends of any particular arm 20 will always be positioned angularly with respect to each other as is shown by comparing Figures 2 and 3.

As the angles of the centrifugal-member guides depend upon each position of the rollers 27 and 28 within its cam runway and as there are an odd number of said centrifugal-member guides upon each side of the device and as the cam runways are positioned angularly with respect to each other, there will never be two centrifugal-member guides having the same angular positions during the revolution of the drive shaft 15.

The operation of the device is as follows:—

The revolution of the drive shaft 15 revolves the spider 18, the legs 19, 19 and their arms 20, 20. This revolution imparts a centrifugal movement to the centrifugal-members tending to force them outwardly along the centrifugal-member guides, thus causing them to bear and abut upon the side walls of the cam runways.

It will be noted that the line of direction of the centrifugal force is not at right angles to the axial line of the drive shaft but is always directed forwardly of the arc of revolution, thus transmitting forwardly centrifugal force, to the driven member.

Further, the constantly changing line of direction of centrifugal force with respect to the axial line of the drive shaft overcomes the objection to a fixed line of direction of centrifugal force with respect to the axial line of the drive shaft, in which latter case there are positions during the revolution when the line of direction of centrifugal force is opposed to driving the driven member, as for instance at the top and bottom portions of the cam-way.

Further while the ends of the arms 20, 20 revolve in a circular movement around the drive shaft 15, the relative positions of the rollers 27 and 28 thereto are constantly changing, and as these two rollers 27 and 28 are in fixed position with respect to each other upon the base 25, and as the line of direction of centrifugal force of these two rollers do not coincide, their lines of centrifugal forces are not identical. Because of the above conditions, the resultant of the lines of force of the two rollers varies inwardly and outwardly against the respective inner and outer walls of the cam-runway, causing a constant forwardly directed centrifugal force upon either the inner or the outer wall, or both, thus producing a constant revolving force upon the driven member.

While, I may use a driven member having but one cam runway end and one series of centrifugal members, I prefer to use the double set as shown, as they not only balance the device, but by positioning the cam runways in angular position with respect to each other, I produce a device in which I have, at any moment, twice the number of lines of force direction, thus causing a better balanced and more effective device.

While I may employ an even number of centrifugal members in each series, I prefer to employ an odd number in order that no two centrifugal-member guides in any one series will at any time have the same angular position with respect to the direction of revolution of the driven member.

While I prefer to employ two offset centrifugal rollers, as shown, any suitable number of such rollers may be used or they may be entirely dispensed with. In my specification and drawings, I refer to the centrifugal-member carrying member as the drive member and the cam runway member as the driven member, but it is evident that these terms may be reversed if the cam runway member is used as the drive member, and hence, in my specification and claims I use the terms interchangeably.

I do not limit myself to the particular size, shape and number or arrangement of parts as shown and described, as these are given simply as a means for clearly describing my invention.

What I claim is:—

1. In a variable speed transmission, in combination, a revoluble driven member having a cam runway, a revoluble drive member, a plurality of centrifugal-member guides pivotally carried by said drive member and a centrifugal-member carried by each said guide positioned within and movable within said cam runway, so positioned that the revolution of the drive member will cause the centrifugal-members to revolve the driven member.

2. In a variable speed transmission, in combination, a revoluble driven member having a non-circular cam runway, a revoluble drive member, a plurality of centrifugal-member guides pivotally carried by said drive member and a slidable centrifugal member carried by each said guide positioned within and movable within said cam runway, so positioned that the revolution of the drive member will cause the centrifugal-members to revolve the driven member.

3. In a variable speed transmission, in combination a revoluble driven member having an elliptical-like cam runway, a revoluble drive member, a plurality of centrifugal-member guides pivotally carried by said drive member, and a slidable centrifugal member carried by each said guide positioned within and movable within said cam runway, so positioned that the revolution of the drive member will cause the centrifugal-members to revolve the driven member.

4. In a variable speed transmission, in combination, a revoluble driven member having a cam runway, a revolving drive member having a plurality of extended arms, a centrifugal member guide pivotally carried by each said arm, and a centrifugal member carried by each said arm positioned within said cam runway, so positioned that the revolution of the drive member will cause the centrifugal-members to revolve the driven member.

5. In a variable speed transmission, in combination, a revoluble driven member having a cam runway, a revoluble drive member, a plurality of centrifugal-member guides pivotally carried by said drive member, a centrifugal-member carried by each said guide and roller means carried by each said centrifugal member positioned within and movable within said cam runway, so positioned that the revolution of the drive member will cause the roller means to revolve said driven member.

6. In a variable speed transmission, in combination a revoluble driven member having a non-circular cam runway, a revoluble drive member, a plurality of centrifugal-member guides pivotally carried by said drive member, a slidable centrifugal-member carried by each said guide and roller means carried by each said centrifugal-member positioned within and movable within said cam runway, so positioned that the revolution of the drive member will cause the roller means to revolve said driven member.

7. In a variable speed transmission, in combination a revoluble driven member having a cam runway, a revoluble drive member having a plurality of extended arms, a centrifugal member guide pivotally carried by each said arm, a centrifugal member carried by each said guide and roller means carried by each said guide positioned within and movable within said cam runway, so positioned that the revolution of the drive member will cause the roller means to revolve the driven member.

8. In a variable speed transmission, in combination a revoluble driven member having a non-circular cam runway, a revoluble drive member having a plurality of extended arms, a centrifugal member guide pivotally carried by each said arm, a slidable centrifugal-member carried by each said guide and roller means carried by each said guide positioned within and movable within said cam runway, so positioned that the revolution of the drive member will cause the roller means to revolve the driven member.

9. In a variable speed transmission, in combination, a revoluble driven member having a non-circular cam runway, a revoluble drive member, a plurality of centrifugal-member guides pivotally carried by said drive member, a slidable centrifugal-member carried by each said guide and a plurality of rollers carried by each said centrifugal-member positioned within and movable within said cam runway, so positioned that the revolution of the drive member will cause the rollers to revolve said driven member.

10. In a variable speed transmission, in combination, a revoluble driven member having a non-circular cam runway, a revoluble drive member having a plurality of extended arms, a centrifugal-member guide pivotally carried by each said arm, a slidable centrifugal-member carried by each said guide and a plurality of rollers carried by each said guide positioned within and movable within said cam runway, so positioned that the revolution of the drive member will cause the rollers to revolve the driven member.

11. In a variable speed transmission, in combination, a revoluble driven member having a non-circular cam runway, a revoluble drive member, a plurality of centrifugal-member guides pivotally carried by said drive member, a slidable centrifugal-member carried by each said guide and a plurality of offset rollers carried by each said centrifugal-member positioned within and movable within said cam runway, so positioned that the revolution of the drive member will cause the rollers to revolve said driven member.

12. In a variable speed transmission, in combination, a revoluble driven member having a non-circular cam runway, a revoluble drive member having a plurality of extended arms, a centrifugal-member guide pivotally carried by each said arm, a slidable centrifugal-member carried by each said guide and a plurality of offset rollers carried by each said guide positioned within and movable within said cam runway, so positioned that the revolution of the drive member will cause the rollers to revolve the driven member.

13. In a variable speed transmission, in combination, a revoluble driven member having two ends, each end having a cam runway in its inner face; a revoluble drive member positioned between the driven member ends; two series of centrifugal-member guides pivotally carried by said drive member; and a centrifugal-member carried by each said guide, the centrifugal members of one series of guides being positioned within and movable within the one cam runway and the centrifugal-members of the other series of guides being positioned within and movable within the other cam runway and so positioned that the revolution of the drive member will cause the centrifugal-members to revolve the driven member.

14. In a variable speed transmission, in combination, a revoluble driven member having two ends, each end having a non-circular cam runway in its inner face; a revoluble drive member positioned between the driven member ends; two series of centrifugal-member guides pivotally carried by said drive member; and a slidable centrifugal member carried by each said guide, the centrifugal-members of one series of guides being positioned within and movable within one cam runway and the centrifugal-members of the other series of guides being positioned within and movable within the other cam runway and so positioned that the revolution of the drive member will cause the centrifugal members to revolve the driven member.

15. In a variable speed transmission, in combination, a revoluble driven member having two ends, each end having a non-circular cam runway in its inner face, the axis of the runways being positioned angularly with respect to each other; a revoluble drive member positioned between the driven member ends; two series of centrifugal-member guides pivotally carried by said drive member; and a slidable centrifugal member carried by each said guide, the centrifugal-members of one series of guides being positioned within and movable within one cam runway and the centrifugal-members of the other series of guides being positioned within and movable within the other cam runway and so positioned that the revolution of the drive member will cause the centrifugal-members to revolve the driven member.

16. In a variable speed transmission, in combination, a revoluble driven member having two ends, each end having a cam runway in its inner face, a revoluble drive member positioned between the drive member ends, two series of centrifugal-member guides pivotally carried by said drive member; a centrifugal-member carried by each said guide; and roller means carried by each said centrifugal-member, the roller means of one series of centrifugal-members being positioned within and movable within one cam runway and the roller means of the other series of centrifugal-members being positioned within and movable within the other cam runway and so positioned that the revolution of the drive member will cause the roller means to revolve the driven member.

17. In a variable speed transmission, in combination a revoluble driven member having two ends, each end having a non-circular cam runway in its inner face, a revoluble drive member positioned between the driven member ends, two series of centrifugal-member guides pivotally carried by said drive member; a slidable centrifugal-member carried by each said guide; and roller means carried by each said centrifugal-member the roller means of one series of centrifugal-members being positioned within and movable within one cam runway and the roller means of the other series of centrifugal-members being positioned within and movable within the other cam runway, and so positioned that the revolution of the drive member will cause the roller means to revolve the driven member.

18. In a variable speed transmission, in combination a revoluble driven member having two ends, each end having a non-circular cam runway in its inner face, the axis of the runways being positioned angularly with respect to each other, a revoluble drive member positioned between the driven member ends, two series of centrifugal-member guides pivotally carried by said drive member; a slidable centrifugal-member carried by each said guide, and roller means carried by each said centrifugal-member, the roller means of one series of centrifugal members being positioned within and movable within one cam runway and the roller means of the other series of centrifugal members being positioned within and movable within the other cam runway, and so positioned that the revolution of the drive member will cause the roller means to revolve the driven member.

19. In a variable speed transmission, in combination, a revoluble driven member having two ends, each end having a non-circular cam runway in its inner face; a revoluble drive member positioned between the driven member ends, two series of centrifugal-member guides pivotally carried by said drive member, a centrifugal member carried by each said guide; and a plurality of rollers carried by each said centrifugal-member the rollers of one series of centrifugal-members being positioned within and movable within one cam runway and the rollers of the other series of centrifugal-members being positioned within and movable within the other cam runway and so positioned that the revolution of the drive member will cause the rollers to revolve the driven member.

20. In a variable speed transmission, in combination a revoluble driven member having two ends, each end having a non-circular cam runway in its inner face; a revoluble drive-member positioned between the driven member ends; two series of centrifugal-member guides pivotally carried by said drive member; a centrifugal-member carried by each said guide; and a plurality of offset rollers carried by each said centrifugal-member, the rollers of one series of centrifugal-members being positioned within and movable within one cam runway and the rollers of the other series of centrifugal-members being positioned within and movable within the other cam runway and so positioned that the revolution of the drive member will cause the rollers to revolve the driven member.

Signed at New York city, in the county of New York and State of New York this 13th day of September, 1928.

ALPHONSE A. HEINZELMAN.